Feb. 10, 1970   RIICHI KOJIMA   3,494,233
CUTTING APPARATUS FOR PIPES, ROUND IRON BARS AND
VARIOUS STEEL SHAPES

Filed May 2, 1968   2 Sheets-Sheet 1

RIICHI KOJIMA.
INVENTOR.

BY Wenderoth, Lind & Ponack
ATTORNEY

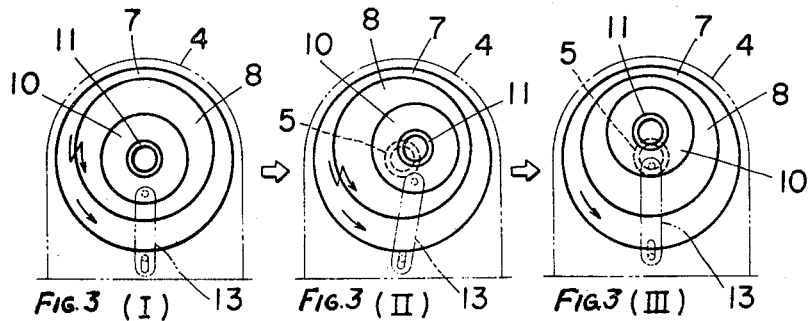
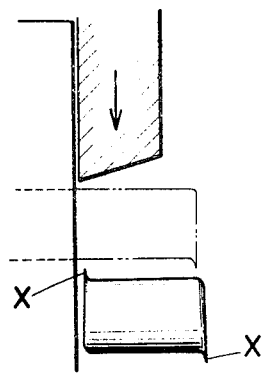
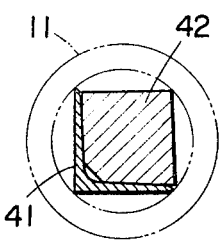
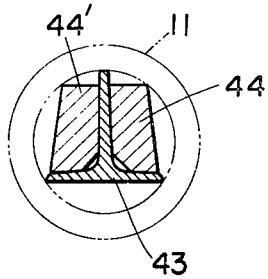
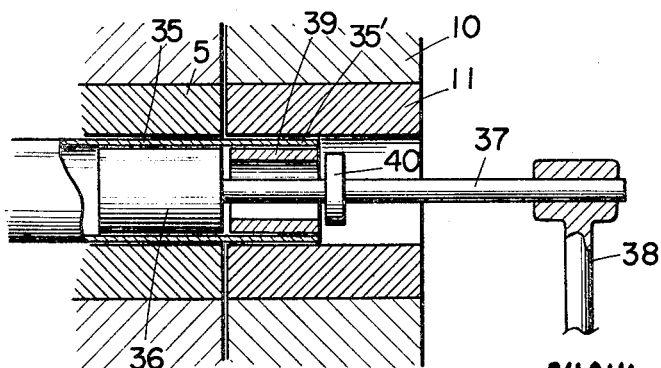

United States Patent Office 3,494,233
Patented Feb. 10, 1970

3,494,233
CUTTING APPARATUS FOR PIPES, ROUND IRON BARS AND VARIOUS STEEL SHAPES
Riichi Kojima, Yamagata-shi, Japan, assignor to Dainippon Ink and Chemicals, Incorporated, Tokyo, Japan
Filed May 2, 1968, Ser. No. 726,157
Claims priority, application Japan, May 4, 1967, 42/28,058
Int. Cl. B26d 1/00
U.S. Cl. 83—199       9 Claims

ABSTRACT OF THE DISCLOSURE

A cutting apparatus for pipes, round iron bars, and various steel shapes. The apparatus comprises a non-rotatable die apparatus and a rotating die apparatus mounted close to the said non-rotatable die apparatus. The non-rotatable die apparatus has a base and a hollow fixed die mounted on the base. The rotating die apparatus has a base, a hollow rotating die, a rotating eccentricity producing means rotatably mounted on said base for high speed revolution, the hollow rotating die being mounted therein. The eccentricity producing means is operable to displace said hollow rotary die from the center position of the said eccentricity producing means. The fixed hollow die and the hollow rotating die are coaxial when the hollow rotating die is positioned in the center of the said means. Stop means is connected to the hollow rotating die for holding it against rotation while allowing it to orbit. As the position of the rotary die is displaced to increase its eccentricity, an eccentric turning movement is performed and cutting is performed on material to be cut which is positioned in the hollow dies from the outer circumference toward the center of the material.

---

This invention relates to a cutting apparatus for pipes, round iron bars, and various steel shapes. However, the material to be cut by the apparatus of the invention is not limited to the said pipes, bars, and shapes.

When cutting the pipes, iron bars or the L-shaped and T-shaped steel beams, excepting when using a saw, the method generally comprises a cutting edge on one side of the piece to be cut and applying a force thereto, so that the cutting is solely a one direction shearing. However, this method has the defects that the cut surface is not even, and a flashing is left on the end of the piece in the cutting direction.

The object of this invention is to provide a cutting apparatus which will not produce flashing, and a further treatment of the cut surface after the cutting is not necessary.

Another object of this invention is to provide a cutting apparatus which will cut without placing excessive force on the material to be cut.

Another object of this invention is to provide a cutting apparatus in which a uniform shearing force acts around the entire surface of the outer circumference toward the center of the material to be cut, thus making a speedy and even cut.

Other objects and advantages of this invention will be made clear from the accompanying specification and drawings, in which.

Figure 1:
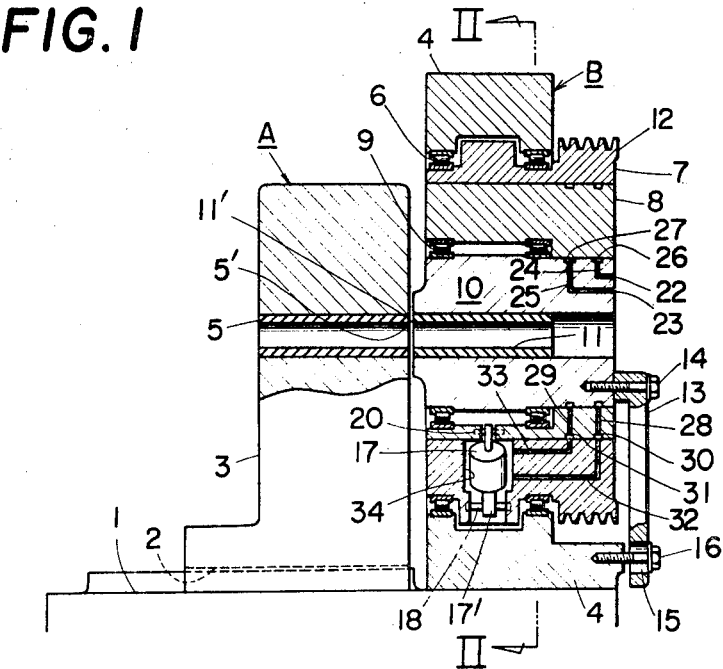
FIG. 1 is a longitudinal vertical sectional view of a preferred embodiment of the present invention.

FIGS. 3I–3III are diagrams illustrating the operation of the apparatus of this invention;

FIG. 4 is a diagram illustrating the operation of the conventional shearing apparatus;

FIG. 5 is a sectional view of a part of the apparatus of the present invention in which a supporter is provided for the article being cut; and FIGS. 6a and 6b are sectional diagrams showing the supporters.

As shown in the drawings, a frame 1 has a non-rotatable die apparatus A thereon and a rotating die apparatus B thereon next to the non-rotatable die apparatus A. The non-rotatable die appartus A is freely slidable on a key 2a fitting in a dovetail groove 2 on the lower face of the base 3 of the frame 1, thus making possible the adjusting of the position of the base 3 in a horizontal direction. The base 4 of the rotating die apparatus B is fixed to the frame 1. A hollow die 5 is fixed to the base 3 of the non-rotatable die apparatus, and the end 5′, which is toward the rotating die apparatus B, is a cutting edge.

An eccentric outer rotor 7 is concentrically rotatably mounted in the base 4 of the rotating die apparatus, roller bearings 6 being provided between said rotor and base. An eccentric inner rotor 8 is rotatably mounted in the eccentric outer rotor 7 in a sliding bearing relationship therewith and eccentrically of the axis of rotation thereof. A die supporter 10 is rotatably mounted in the bearings 9 in the eccentric inner rotor 8 eccentrically of the center axis Q thereof, and a hollow rotating die 11 is fixed in the center of the die supporter 10. The end 11′ of the die 11 is a cutting edge opposed to the cutting edge 5′ of the fixed die 5.

Figure 2:
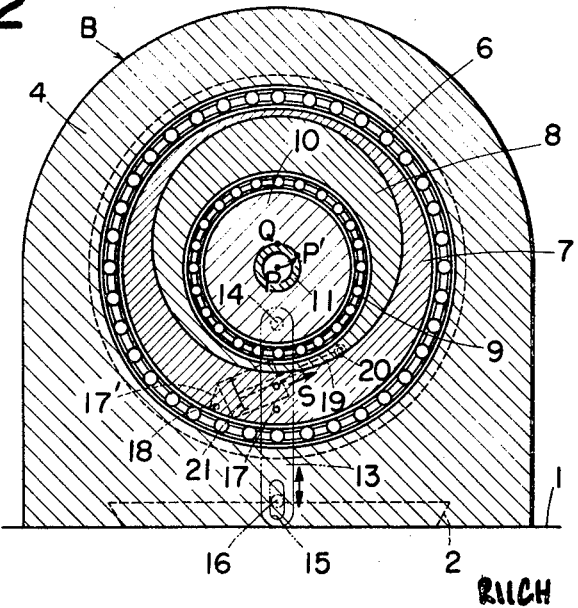
FIG. 2 is a transverse sectional view taken along line II—II of FIG. 1.

The foregoing eccentric outer rotor 7 and eccentric inner rotor 8, both have the same amount of eccentricity and are relatively rotatable so that the eccentricity can be mutually offset. When the relative eccentric position of the eccentric inner rotor 8 in the eccentric outer rotor 7 is made to differ by 180 degrees, the center P of die 11 is coaxial with the center of the bearings 6 of the base 4, the parts being positioned as shown in FIG. 2, and it also is coaxial with the center of the outer diameter of the eccentric outer rotor 7. However, when the relative positions of the rotors is varied, the center P of the die 11 moves away from the center of the bearings 6 of the base 4.

The eccentric outer rotor 7 is rotatable at a high speed (1500–3000 revolutions per minute) from a driving pulley 12 formed on the outer circumference thereof. However, a stop 13 is provided to block the rotation of the die supporter 10. The stop 13 is connected to the die supporter 10 at its outer end by a pin 14, and an elongated aperture 15 is provided in the lower end thereof, through which extends a pin 16 projecting out of the base 4. Therefore, the die supporter 10 can perform orbital motion if the center P of the die 11 moves out of its position at the center of the bearings 6 of the base 4 as stated previously.

The relationship of the eccentric outer rotor 7 and the eccentric inner rotor 8, which establishes the eccentric position of the die 11, can be varied by means of a piston-cylinder device having a cylinder 17. The base 17′ of the cylinder 17 is connected to a part of the eccentric outer rotor 7 by a pin 18, and the free end of a piston rod 19 of the device is connected to the eccentric inner rotor 8 by the pin 20. The piston rod 19 can be extended in the direction of the arrow S by oil pressure supplied to the cylinder 17 and acting on piston 21. By the extension of said piston rod, the eccentric inner rotor 8 is rotated within the outer rotor around the center Q. As a result, the center P of the die 11 moves with the eccentric rotor 8 in a circle around the center Q with a radius of Q–P in the direction of arrow P′, and thus when the outer rotor 7 rotates, the center P will perform an eccentric movement. The center P of the die 11 returns to its former position coaxial with the center of rotor 7 when counter pressure is supplied to the cylinder 17 and the piston 21 is returned to its initial position.

The oil is supplied to the cylinder 17 as follows:

An outlet and inlet 22 and 23 are provided on one side of the die supporter 10 and passages 24 and 25 extend therefrom to concave grooves 26 and 27 formed in the outer surface of the said supporter 10. Passages 28 and 29, which are aligned with the concave grooves 26 and 27 are extended through the eccentric inner rotor 8 to concave grooves 30 and 31 on the outer surface thereof. Passages 32 and 33 which are aligned with the concave grooves 30 and 31 extend through the eccentric outer rotor 7 and open into the space 34 bored in the eccentric outer rotor 7. They can be connected to the cylinder 17 mounted in the said space by various flexible pipes, etc. (not shown). Furthermore, the outlet and inlet 22 and 23, in the die supporter 10, are connected to an oil pressure source through flexible pipes and the like (also not shown).

With the cutting apparatus constructed as described above, the entire outer surface of the material to be cut, and which is positioned in the dies 5 and 11, can be acted on by an even shearing force. Firstly, as shown in FIG. 3I, the center of the die 11 and the center of the bearings 6 are coaxial, and at this time, dies 11 and 5 are on an identical axis. The material to be cut is inserted into the two dies 11 and 5, with the point at which the cut is to be made between the dies. The inner and outer eccentric rotors are then driven, and because the center of the bearings 6, the center of die supporter 10 and the center of the die 11 are coaxial, and the revolution of the die supporter 10 is prevented by the stop 13, the die supporter 10 is almost at a standstill. Next, with the eccentric inner rotor 8 rotating together with the eccentric outer rotor 7, the eccentric inner rotor 8 is rotated relative to the eccentric outer rotor 7 by the movement of the piston rod 19 in the direction of the arrow S by oil under pressure supplied to the cylinder 17. The die supporter 10 having the die 11 at its center moves along a circle having a radius Q–P with the center Q as its center. As a result, the die supporter 10 and the die 11 perform an orbiting movement, as shown in FIGS. 3II and 3III, the die 11 and supporter 10 maintaining substantially the same vertical position during the orbiting, so that the outer surface of the material to be cut is sheared between the cutting edges 5′ and 11′ of the dies 5 and 11, an even shearing force acting on the entire circumference of the cutting material. By increasing the relative eccentricity of rotors 7 and 8, and hence the eccentricity of die supporter 10, the depth of the cutting action can be increased until the material is completely cut.

When cutting a thin pipe or steel shape having an L-shaped or a T-shaped cross section, it is advisable to put a core in the material to be cut to prevent buckling.

FIG. 5 shows one arrangement of such a core used when cutting thin pipe 35. A core 36 is inserted into the pipe 35 and a shaft 37 projects from said core, and if the occasion demands, the end of the shaft 37 is supported by a support 38. A reinforcing ring 39 is inserted in the inside of the cut section 35′ of the pipe, a suitable clearance being left between the edge surface of the said reinforcing ring and the point at which the pipe 35 is to be cut.

A stop 40 is provided on shaft 37 to prevent the ring 39 from coming out of the section 35′ of the pipe. It will be understood that sufficient space should be provided between the shaft 37 and the inside of reinforcing ring 39 to allow eccentric turning movement of the die 11. With this method, there is no danger of buckling, even of thin pipes, and cutting can be performed smoothly and accurately.

In the case of steel having an L-shaped or T-shaped cross-section, a reinforcing body having a cross-section complementary to the section of the material being cut is used, as shown in FIGS. 6a and 6b. For instance, with an L-shaped member 41, a square shaped reinforcing body 42 is used to fill in the L-shape, and with a T-shaped member 43, reinforcing bodies 44 and 44′ are used to hold the middle section from both sides. A core, as described above, is not always a necessary substance. Even with thin pipes and shaped steel, buckling does not occur and cutting can be performed efficiently by selecting the interval, the rotational speed, and the speed of the eccentric drive of the dies 5 and 11.

The shearing force produced by the apparatus of this invention acts uniformly around the entire circumference of the material to be cut, and moreover, as it acts gradually from the outer circumference toward the center, there is no danger of a flashing being produced as in conventional shearing devices. Thus, cutting is performed smoothly and accurately.

Furthermore, in the figures and in the foregoing embodiments, the means for producing the eccentricity of the rotors is shown as an oil pressure cylinder. However, such means is not limited to an oil pressure cylinder. The eccentricity of the dies can be produced by driving the eccentric inner rotor a little faster than the eccentric outer rotor, while the eccentric outer rotor and the eccentric inner rotor are simultaneously rotating at high speed.

It is thought that the invention and its advantages will be understood from the foregoing description, and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. A cutting apparatus for pipes, round iron bars, and various steel shapes, said apparatus comprising a non-rotatable die apparatus and a rotating die apparatus mounted close to the said non-rotatable die apparatus, the non-rotatable die apparatus having a base and a hollow fixed die mounted on the base, the rotating die apparatus comprising a base, a hollow rotating die, a rotating eccentricity producing means rotatably mounted on said base for high speed revolution and having said hollow rotating die mounted therein, said eccentricity producing means being operable to displace said hollow rotary die from the center position of the said means, the fixed hollow die and the hollow rotating die being coaxial when the hollow rotating die is positioned in the center of the said means, and stop means connected to the hollow rotating die for holding it against rotation while allowing it to orbit, whereby as the position of the rotary die is displaced to increase its eccentricity, an eccentric turning movement is performed and cutting is performed on material to be cut which is positioned in the hollow dies from the outer circumference toward the center of the material.

2. A cutting apparatus as claimed in claim 1 in which said eccentricity producing means comprises an eccentric outer rotor which is rotatably mounted for high speed rotation, an eccentric inner rotor rotatably mounted in the said eccentric outer rotor eccentrically of the axis of rotation thereof, and a die supporter rotatably mounted in the said eccentric inner rotor, eccentrically of the center axis thereof, said hollow rotating die being mounted in the center of the die supporter and said stop being connected to said die supporter, the eccentricity of the inner rotor within the outer rotor and the supporter within the inner rotor being equal and the inner rotor and die supporter being relatively rotatable to offset the eccentricity thereof to place the hollow rotating die on an axis aligned with the non-rotatable hollow die, and rotor turning means connected to said rotors to rotate the rotors relative to each other to change the relative eccentricity of said inner rotor and said die supporter.

3. A cutting apparatus as claimed in claim 2, wherein bearings are provided between the eccentric outer rotor and the fixed base and between the die supporter and the eccentric inner rotor.

4. A cutting apparatus as claimed in claim 2 in which said eccentric outer rotor has a space therein, an oil pressure cylinder in said space and mounted on the eccentric outer rotor, a position in said oil pressure cylinder having a rod connected to the eccentric inner rotor, and means to supply oil under pressure to the said oil pressure cylinder for turning the eccentric rotor relative to the eccentric outer rotor.

5. A cutting apparatus as claimed in claim 4, wherein a portion of the die supporter and the eccentric inner rotor are in sliding bearing contact, and said eccentric inner rotor and eccentric outer rotor are in sliding bearing contact, one of said rotors having two concave grooves around the entire circumference thereof and the sliding bearing surface of the eccentric inner rotor having two grooves around the circumference thereof, the die supporter having an oil flow inlet and flow outlet opening out of one end thereof, and the supporter, inner and outer rotors having passages therethrough and connected to the oil pressure cylinder in the eccentric outer rotor and extending between the respective concave grooves.

6. A cutting apparatus as claimed in claim 2, wherein on one section of the outer circumference of the eccentric outer rotor is in the form of a pulley for driving the eccentric outer rotor at high speed.

7. A cutting apparatus as claimed in claim 2 wherein a pin connects one end of the stop means to the die supporter, the other end of the said stopper having a long aperture therein, and a further pin extending through the said long aperture and connecting the other end of the said stopper to the base and allowing eccentric orbiting movement while blocking the rotation of the hollow rotating die.

8. A cutting apparatus as claimed in claim 1 wherein the base of the rotating apparatus is fixed, and the base of the non-rotatable die apparatus is movable toward and away from the rotatable die apparatus so that the distance between the rotating die apparatus and the fixed die apparatus can be adjusted.

9. A cutting apparatus as claimed in claim 1, further comprising a reinforcing core for insertion into the dies in association with the material to be cut to prevent buckling of the material.

References Cited

UNITED STATES PATENTS

| | | | |
|---|---|---|---|
| 1,216,426 | 2/1917 | Erickson | 83—199 |
| 2,939,353 | 6/1960 | Vickers | 83—199 X |

FOREIGN PATENTS

| | | |
|---|---|---|
| 236,491 | 7/1925 | Great Britain. |

FRANK T. YOST, Primary Examiner